(12) United States Patent
Appleyard et al.

(10) Patent No.: US 7,318,687 B2
(45) Date of Patent: Jan. 15, 2008

(54) CONNECTION BETWEEN COMPONENTS

(75) Inventors: Michael Appleyard, Cheltenham (GB); Stephen David Butler, Wolverhampton (GB); Mark Anthony Wilkes, Birmingham (GB)

(73) Assignee: TRW LucasVarity Electric Steering Limited (GB)

( * ) Notice: Subject to any disclaimer, the term of this patent is extended or adjusted under 35 U.S.C. 154(b) by 112 days.

(21) Appl. No.: 11/176,943

(22) Filed: Jul. 7, 2005

(65) Prior Publication Data

US 2006/0034650 A1    Feb. 16, 2006

Related U.S. Application Data

(63) Continuation of application No. PCT/GB2004/000035, filed on Jan. 8, 2004.

(30) Foreign Application Priority Data

Jan. 8, 2003    (GB) ................................ 0303317.5

(51) Int. Cl.
F16D 1/00    (2006.01)
F16B 1/00    (2006.01)

(52) U.S. Cl. .................... 403/341; 403/398; 403/386; 403/157

(58) Field of Classification Search ............. 403/386, 403/395, 397, 398, 292, 316, 159, 157, 290; 464/132, 134
See application file for complete search history.

(56) References Cited

U.S. PATENT DOCUMENTS 3,526,870 A * 9/1970 Mayala ...................... 439/397

| 4,537,523 A | | 8/1985 | Haldric |
| 5,104,252 A | * | 4/1992 | Colonias et al. .......... 403/232.1 |
| 5,358,350 A | * | 10/1994 | Oertle ........................ 403/12 |
| 6,155,739 A | * | 12/2000 | Sekine et al. ................ 403/12 |
| 2001/0012470 A1 | * | 8/2001 | Ikeda ......................... 403/290 |

FOREIGN PATENT DOCUMENTS

| DE | 3839324 | 5/1990 |
| DE | 40 13 810 | 10/1991 |
| DE | 4013810 | 10/1991 |
| DE | 41 29 042 | 3/1993 |
| DE | 19847526 | 4/2000 |
| EP | 0 820 915 | 1/1998 |
| FR | 2 624 083 | 6/1989 |
| FR | 2 627 560 | 8/1989 |

* cited by examiner

Primary Examiner—James M. Hewitt
Assistant Examiner—Joshua T Kennedy
(74) Attorney, Agent, or Firm—MacMillan, Sobanski & Todd, LLC

(57) ABSTRACT

An assembly comprises a male component and a female component which connect together to form a mechanical connection, the female component being adapted to at least partially receive an end portion of the male component. The female component has at least one bore which is adapted to receive a clamping pin which can be tightened to clamp the female component around the male component. A guide is provided which is carried by the male component and which defines at least one blocking region and one opening region, the opening region being aligned with the at least one bore in the female component to permit insertion of the clamping pin into the bore when the male component and female component are correctly aligned and the blocking region otherwise preventing insertion of the clamping pin when the male component is inserted into the female component with an incorrect alignment. The guide assists in achieving correct alignment of the male and female components during assembly.

9 Claims, 3 Drawing Sheets

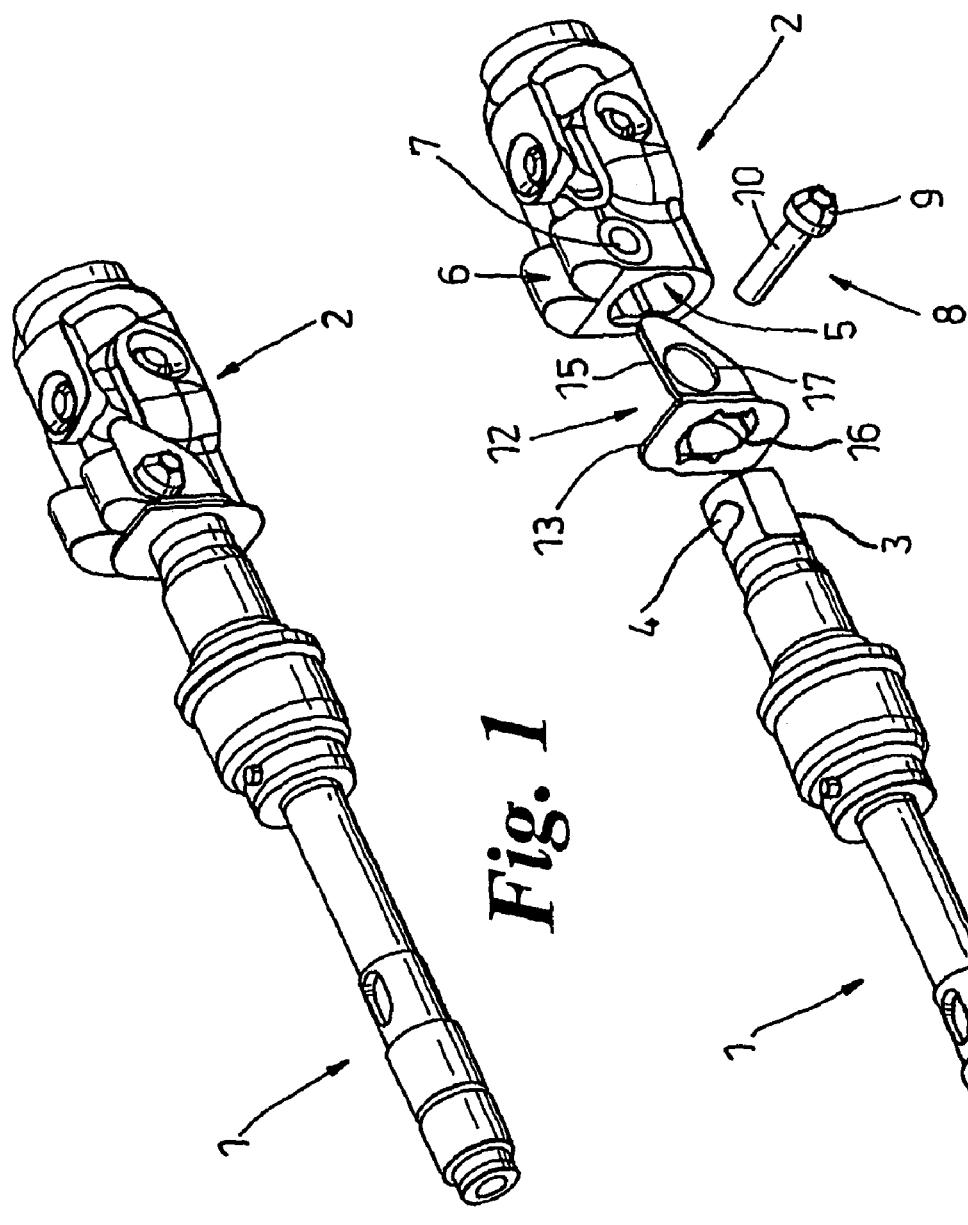

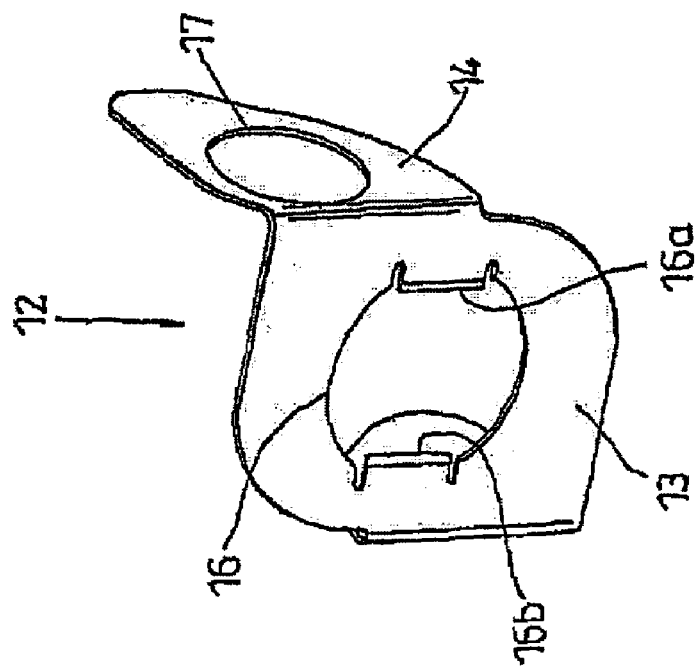
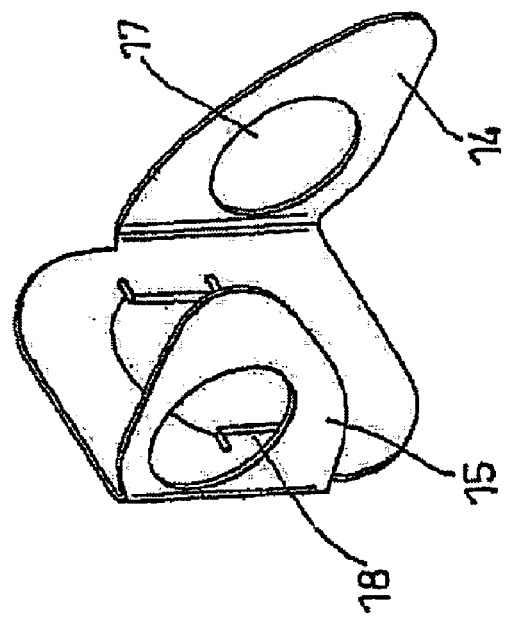
Fig. 3(a)
Fig. 3(b)

CONNECTION BETWEEN COMPONENTS

CROSS REFERENCE TO RELATED APPLICATIONS

This application is a continuation of International Application No. PCT/GB2004/000035 filed Jan. 8, 2004, the disclosures of which are incorporated herein by reference, and which claimed priority to Great Britain Patent Application No. 0300317.5 filed Jan. 8, 2003, the disclosures of which are incorporated herein by reference.

BACKGROUND OF THE INVENTION

This invention relates to an improved connection of components which prevents the incorrect assembly or interconnection of the two components. The components may comprise a male component and a female component of an electric power assisted steering assembly such as a shaft which is inserted into a yoke component for subsequent connection to a shaft joint.

It is known to provide shafts which are inserted at one end into a mating yoke. The yoke, which is typically open along one side and of greater internal diameter than the shaft which is inserted into it is tightened by a clamping collar or a clamp bolt causing the open side to close and for the yoke to clamp the end of the shaft. It is important to ensure that the shaft is inserted to the correct depth in the yoke to ensure that the overall combination of shaft and yoke is of the correct length and that the joint is mechanically engaged.

In many assemblies the operator making the joint cannot tell how far the shaft is inserted into the yoke. On tightening of the yoke only a partial engagement may be achieved which could lead to eventual failure of the joint.

In one known solution a groove is provided around a circumference of the shaft at a distance from the end which lies within the yoke when the shaft is inserted. A pinch bolt passes through the yoke which lies partially within the groove in the shaft when the shaft is correctly inserted. If the shaft is slightly too far in or out of the yoke the pin cannot be inserted as its passage is blocked by the shaft.

Whilst this solution has proven popular problems can arise if the shaft is only inserted into the yoke by a small amount such that the pin passes across the end of the shaft. I.e. the shaft does not reach the point at which the pin passes. The assembler may think the shaft is correctly inserted as the pin has gone in, not realizing it has in fact slid across the end of the shaft rather than gone into the groove.

BRIEF SUMMARY OF THE INVENTION

An object of the present invention is to ameliorate this problem.

According to a first aspect the invention provides an assembly comprising a male component and a female component which connect together to form a mechanical connection, the female component being adapted to at least partially receive an end portion of the male component and having at least one bore which is adapted to receive a clamping pin which can be tightened to clamp the female component around the male component, and further in which a guide is provided which is carried by the male component and which defines at least one blocking region and one opening region, the opening region being aligned with the at least one bore in the female component to permit insertion of the clamping pin into the bore when the male component and female component are correctly aligned and the blocking region otherwise preventing insertion of the clamping pin when the male component is inserted into the female component with an incorrect alignment.

The construction of the components may be such that the pin can only be inserted through the opening region into the bore if the first and second components are correctly aligned or if the first and second components are completely separated, the blocking region preventing insertion of the pin at all other times.

The male component may comprise a shaft having a male end portion. The female component may comprise a yoke which is adapted to receive the end portion of the male component. This may be part of a universal joint. Of course, the two components may have other forms, perhaps forming a rigid joint between shafts, or a shaft and a hub or gear or the like. They may form part of an electric steering system connecting a road wheel to a steering wheel.

The female component may comprise a bore into which part of the male component is inserted. This may be cylindrical or part cylindrical. It may include two bores which face one another on opposing sides of a slot provided in the female component, tightening of the pin forcing the faces of the slot together to close the slot and thereby to clamp the female portion to the male portion. Closing the slot effectively reduces the internal dimensions of the part of the female portion into which the part of the male component fits.

The two bores may comprise two open bores which the clamp pin passes right through and a nut may be provided which is received on an end of the clamping pin opposite a head of the pin, tightening of the nut clamping the female component around the end of the male component.

Alternatively one of the bores may be provided with an internal thread which co-operates with a corresponding thread on one end of the clamp pin. The nut can therefore be eliminated, simplifying assembly.

The guide may comprise a guide bracket which may be separate from the male and female components or perhaps an integral part of the male component and may, for instance, be a press fit onto the end portion. Alternatively, or additionally, the male component may be provided with a portion of increased diameter with the guide being trapped between the increased diameter portion and the female component when the components are assembled.

The guide bracket may be rigid or substantially rigid. It may comprise a sheet metal component which is stamped to provide the blocking region and the opening region. The opening region may comprise a window which is formed in the guide bracket. A cut-out may be provided, by stamping or otherwise, into which the end of the male component is pressed. The cut-out may carry one or more resilient tangs which engage the male component such that the guide can be pressed on with less force than is needed to pull it off the shaft.

The guide may be a U-shaped bracket with a base portion of the bracket receiving the end of the shaft and with two upwardly extending portions or arms of the U-shape each defining a blocking region and an opening region. These opening regions may be circular in outline with a diameter substantially the same as the diameter of a shaft of the pin.

The centre of the opening regions in each upwardly extending portion may be offset from the centre of the opening in the base portion such that an imaginary line drawn at a normal to the opening does not cross a similar line which extends from the centre of the opening in the base portion. The amount of offset should be chosen to correspond to the relative positions of the centre of the slot in the female portion and the axis of the female portion. Both openings in the upwardly extending portions should be offset by the same amount but on opposing sides of the centre axis of the opening in the base portion. This allows the male and female parts to be fitted in one of two angles of rotation which are 180 degrees apart.

Therefore two opening regions may be provided, the clamp pin passing through one or the other depending on the angular orientation of the shaft relative to the yoke. Of course, if the shaft can only be inserted into the yoke in one angular orientation only a single opening region and blocking region need be provided, and the guide bracket could be L-shaped.

Where two openings are provided, one in each upright portion, they may be offset such that the pin may pass through only one of the openings when assembled. Alternatively, they may be aligned such that the pin passes through both openings.

In a modification, each of the upwardly extending portions of the bracket may carry two opening regions. Each of the opening regions of the upwardly extending portions may face a corresponding opening region in the other upwardly extending portion such that a pin may pass through an opening on each upwardly extending portion when the male and female parts are fitted together.

One of the two openings in an upwardly extending portion may be shaped such that the pin passes cleanly through without deformation, the other requiring deformation to do so. This could be achieved by providing an inwardly extending tang on only one of the openings.

Providing openings in this way ensures that the pin can only be readily inserted through one hole first (the one that does not require deformation). This provides control to the direction in which the pin must be inserted when the assembly is assembled. After passing cleanly through one hole it can be forced through the other with the first opening and the female part providing guidance and support.

According to a second aspect the invention provides a guide bracket for use in combination with a male component and a female component to provide an assembly in accordance with the first aspect of the invention.

According to a third aspect the invention provides a guide bracket for use in combination with a male and female component to assist in the alignment of the male and female components upon assembly, the guide comprising a U-shaped bracket having a base portion which includes an opening for receiving the end of the male portion and at least two upwardly extending arms, each arm including an opening region through which a connecting pin may be passed.

It may include any of the aforementioned features of the guide bracket of the first aspect of the invention.

Other advantages of this invention will become apparent to those skilled in the art from the following detailed description of the preferred embodiment, when read in light of the accompanying drawings.

BRIEF DESCRIPTION OF THE DRAWINGS

FIG. 1 is an exploded view of the components prior to assembly;

FIG. 2 is a view corresponding to that of FIG. 1 with the components assembled;

FIGS. 3(a) and (b) are differing perspective views of the guide bracket of the assembly.

DETAILED DESCRIPTION OF THE INVENTION

Figure 4A:
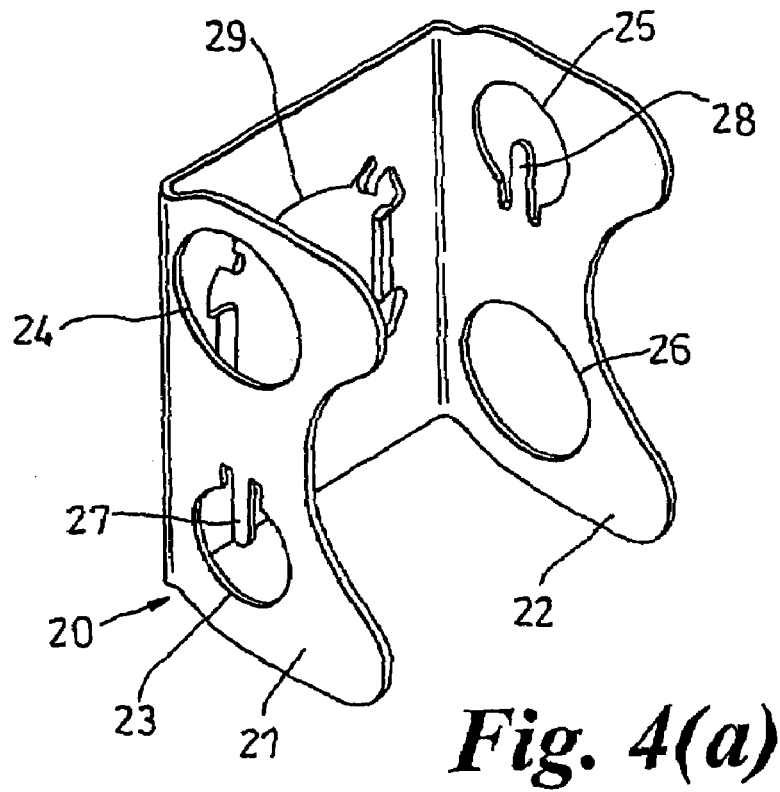
FIGS. 4(a) and (b) are differing perspective views of an alternative guide bracket which comprises a part of an alternative assembly.
Figure 4B:
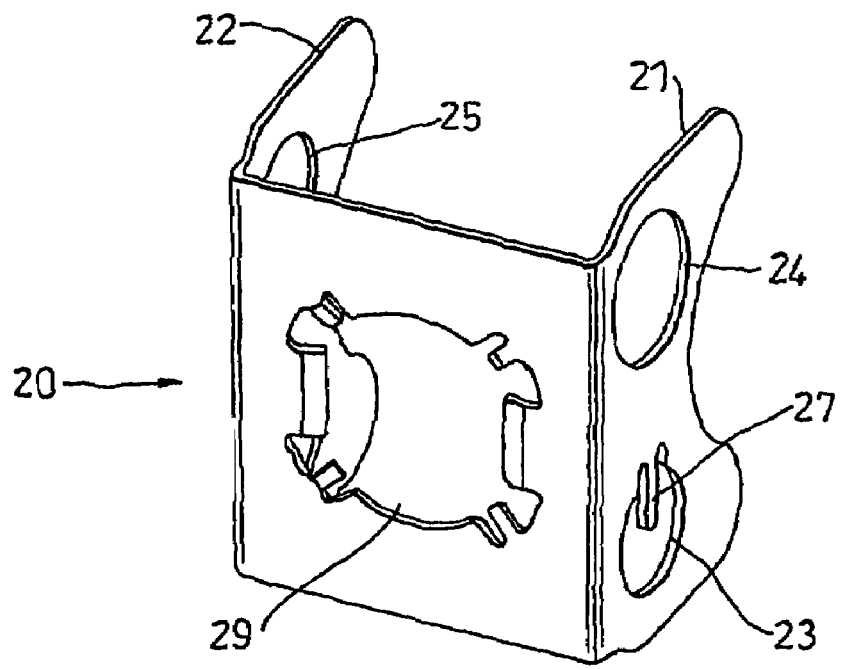

A steering assembly includes a male component, in this example a half shaft 1, which is connectable to a female component such as a yoke 2. The half shaft carries two flats (of which only one flat 3 is visible in the drawings) on one end which are diametrically opposite one another. A groove 4 is also provided which is spaced from the end of the shaft and extends orthogonal to the plane of the two flats. The yoke 2 includes a cylindrical recess 5 which has a cross section that is complimentary to the cross section of the end of the half shaft, and this recess 5 accommodates the end of the shaft when the two parts 1, 2 are connected together.

The wall of the yoke 2 which defines the recess 5 is provided with an elongate slot 6 which runs from the open end of the recess. The slot makes the recess 5 open along one side and two bolt receiving holes are provided—one either side of the opening in the yoke. Only one of the holes 7 is visible in the drawings. At least one of the holes is a blind bore and has an internal thread which receives a threaded end of a clamp bolt 8 when it is passed through the other hole 7 which is an open bore. Thus, the clamp pin 8 having a head 9 and a threaded shank 10 passes through the open bore, across the opening defined by the slit 6 in the side of the yoke 2 and into the threaded bore. The clamp pin 8 can be tightened into the blind bore to cause the open side of the yoke 2 to close up slightly. Tightening the pin 8 in this way allows the yoke 2 to be clamped around the end of the half shaft when it is inserted into the yoke.

To ensure that the half shaft 1 is inserted the correct distance into the recess 5 in the yoke 2 the open and blind holes are arranged such that the passage of the clamp pin 8 across the opening is not possible unless the groove 4 in the half shaft 1 is aligned with the path taken by the pin 8.

A guide bracket 12 is also provided which is secured to the end of the half shaft prior 1 to its fitment to the yoke 2. This guide bracket 12 further helps ensure the correct alignment of the shaft 1 with the yoke 2.

The guide bracket 12 is shown in more detail in FIGS. 3(a) and (b) of the accompanying drawings. It comprises a metal sheet which is bent through a right angle along two lines to form a U-shaped bracket. The base 13 of the U-shaped bracket includes a cut out 16 which has substantially the same shape as the cross section of the end of the half shaft. Two elongate tangs 16a, 16b protrude into the cut out 16 and are resiliently deformed as the base 13 is pressed onto the end of the half shaft until it reaches the end of the flats. The tangs 16a, 16b prevent the removal of the guide bracket 12.

The remaining two upright portions 14, 15 of the guide bracket 12 are each provided with a circular window 17, 18 defining an opening region, the portion of the bracket surrounding the window defining a blocking region. Depending on the orientation of the half shaft 1 relative to the yoke 2 (its cross section permits it to be inserted into the yoke in one of two orientations) one of the windows 17, 18 will be aligned with the open bore in the yoke 2 allowing the clamp pin 8 to pass through.

Because the window 17, 18 is external to the recess 5 in the yoke 2 an assembler readily can tell that the half shaft 1 is correctly inserted into the yoke 2. The number of errors made during assembly are therefore considerably reduced.

An alternative guide bracket 20 is shown in FIGS. 4(a) and (b) of the accompanying drawings. The bracket 20 differs in that each upright 21, 22 of the U-shaped bracket has two openings 23, 24 and 25, 26 respectively. One opening 23, 26 in an upwardly extending portion 21, 22 is sized to allow the pin to pass unimpeded. The other 24, 25 is provided with an inwardly directed tang 27, 28 which must be deformed to allow the pin to pass. The opening in one upright without the tang is in register with the opening in the other upright that has no tang, i.e. they share a common axis. The pin can therefore pass through one opening with a tang and another without to be supported at each end.

The provision of the opening with the tang provides some control over the direction in which the pin is inserted. The tang prevents the pin readily passing through that opening before the other opening, but if it has passed through the other opening first it can easily be deformed to allow the pin to pass.

It will also be observed that the opening 29 for the male component is provided with a set of additional tangs, in this case four, which help to centralise the bracket on the male component. Each tang comprises an inwardly directed part that is slightly resilient.

In use, the male part with the guide bracket 20 is inserted into the female part. The male part is rotated until one of the pairs of openings in the bracket are aligned with the openings in the female part. This can correspond to the bracket being in any one of two positions. The pin is then inserted into an opening in an upright that has no tang and is slid along the groove in the female part. Finally it is pushed through the opening with the tang—deforming the tang as it does so. A retaining nut may then be added to clamp the parts together.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly comprising a male component and a female component which connect together to form a mechanical connection, the female component being adapted to at least partially receive an end portion of the male component, the female component having at least one bore which is adapted to receive a clamping pin which can be tightened to clamp the female component around the male component, and further in which a guide is provided which is carried by the male component and which comprises a U-shaped bracket with a base portion of the bracket having an opening receiving the end of the male portion and upper arm portions each defining two opening regions, each opening region facing a corresponding opening region to define two pairs of openings through which the pin can be passed, wherein in use at least one of the pairs of opening regions is aligned with the at least one bore in the female component to permit insertion of the clamping pin into the bore when the male component and the female component are correctly aligned and the blocking region otherwise preventing insertion of the clamping pin when the male component is inserted into the female component with an incorrect alignment, and in which one opening of each pair is provided with a tang which prevents the pin passing through the opening unless the tang is deformed.

2. The assembly of claim 1 wherein the female component includes two bores which face one another on opposing sides of a slot provided in the female component, tightening of the pin forcing the faces of the slot together to close the slot and thereby to clamp the female portion to the male portion.

3. The assembly of claim 1 wherein the guide comprises a guide bracket which is separate from the male and female components.

4. The assembly of claim 1 wherein the guide comprises a sheet metal component.

5. The assembly of claim 1 wherein each opening region comprises a window which is formed in the bracket.

6. The assembly of claim 1 wherein a cut-out is provided in the guide, by stamping or otherwise, into which the end of the male component is pressed.

7. The assembly of claim 1 wherein the opening in the base includes at least one inwardly directed tang which engages the male portion.

8. The assembly of claim 1 wherein the guide is substantially rigid.

9. The assembly of claim 1 wherein the male component comprises a shaft having a male end portion and the female component comprises a yoke which is adapted to receive the end portion of the male component.

* * * * *